US011383412B2

(12) United States Patent
Buisson et al.

(10) Patent No.: US 11,383,412 B2
(45) Date of Patent: Jul. 12, 2022

(54) PROCESS FOR MANUFACTURING A SHELL COMPRISING A DECORATIVE FILM

(71) Applicant: MARELLI AUTOMOTIVE LIGHTING FRANCE, Saint-Julien-du-Sault (FR)

(72) Inventors: Alain Buisson, Le Mesnil-Saint-Denis (FR); Franck Arrivet, Trappes (FR)

(73) Assignee: MARELLI AUTOMOTIVE LIGHTING FRANCE, Saint-Julien-du-Sault (FR)

( * ) Notice: Subject to any disclaimer, the term of this patent is extended or adjusted under 35 U.S.C. 154(b) by 20 days.

(21) Appl. No.: 16/613,389

(22) PCT Filed: May 15, 2018

(86) PCT No.: PCT/EP2018/062623
§ 371 (c)(1),
(2) Date: Nov. 13, 2019

(87) PCT Pub. No.: WO2018/210882
PCT Pub. Date: Nov. 22, 2018

(65) Prior Publication Data
US 2020/0164557 A1    May 28, 2020

(30) Foreign Application Priority Data
May 15, 2017    (FR) ...................... 1754265

(51) Int. Cl.
*B29C 45/16* (2006.01)
*B29C 45/14* (2006.01)
(Continued)

(52) U.S. Cl.
CPC .. *B29C 45/14688* (2013.01); *B29C 45/14811* (2013.01); *B29C 45/1671* (2013.01);
(Continued)

(58) Field of Classification Search
None
See application file for complete search history.

(56) References Cited

U.S. PATENT DOCUMENTS 4,205,036 A * 5/1980 Trame ..................... B29C 45/14
                                                   264/132
4,481,160 A * 11/1984 Bree ......................... B05D 1/30
                                                    264/1.7
(Continued)

FOREIGN PATENT DOCUMENTS

CN         1504268 A      6/2004
CN         1596189 A      3/2005
(Continued)

OTHER PUBLICATIONS

International Search Report and Written Opinion of the International Searching Authority for PCT International Application No. PCT/EP2018/062623 dated Jul. 2, 2018.
(Continued)

*Primary Examiner* — Edmund H Lee
(74) *Attorney, Agent, or Firm* — Howard & Howard Attorneys PLLC

(57) ABSTRACT

The invention relates to a process for manufacturing a shell, comprising a decorative film, implementing a first step of molding a plastic material so as to form a first element. The invention is characterized in that the manufacturing process implements a second step that consists in applying a decorative film against a front face of the first element, then a third step of overmolding a plastic material over at least one portion of the decorative film and of the first element so as to hold the detective film between the first element and a second element of the shell.

11 Claims, 2 Drawing Sheets

(51) Int. Cl.
*B29K 33/00* (2006.01)
*B29L 31/30* (2006.01)

(52) U.S. Cl.
CPC .............. *B29C 2045/14696* (2013.01); *B29C 2045/1673* (2013.01); *B29K 2033/12* (2013.01); *B29K 2995/0026* (2013.01); *B29L 2031/30* (2013.01)

(56) References Cited

U.S. PATENT DOCUMENTS

| | | | | |
|---|---|---|---|---|
| 6,065,366 | A * | 5/2000 | Koyama | B62D 1/04 156/293 |
| 6,235,227 | B1 * | 5/2001 | Koyama | B62D 1/04 264/132 |
| 6,635,196 | B1 * | 10/2003 | Goggins | 264/1.7 |
| 6,875,301 | B2 * | 4/2005 | Kauppi | B29C 45/14688 156/245 |
| 7,001,542 | B2 * | 2/2006 | Kim | B29D 11/00932 264/1.7 |
| 8,617,670 | B2 * | 12/2013 | Szymberski | B60R 13/005 428/13 |
| 8,617,671 | B2 * | 12/2013 | Greve | B60R 13/005 428/13 |
| 2003/0001310 | A1 | 1/2003 | Masterson et al. | |
| 2004/0216406 | A1 | 11/2004 | Egashira | |
| 2004/0227267 | A1 | 11/2004 | Williams et al. | |
| 2007/0241313 | A1 | 10/2007 | Kato | |
| 2010/0028610 | A1 | 2/2010 | Fujii et al. | |
| 2013/0069274 | A1 * | 3/2013 | Zhang | B29C 45/1671 264/279 |
| 2015/0069644 | A1 | 3/2015 | Emrich et al. | |
| 2015/0140259 | A1 | 5/2015 | Sugiura et al. | |
| 2017/0122521 | A1 | 5/2017 | Tezuka et al. | |

FOREIGN PATENT DOCUMENTS

| | | |
|---|---|---|
| CN | 1942791 A | 4/2007 |
| CN | 101024301 A | 8/2007 |
| CN | 103827732 A | 5/2014 |
| CN | 104416745 A | 3/2015 |
| CN | 106133436 A | 11/2016 |
| EP | 2666610 A1 | 11/2013 |
| EP | 2989237 A1 | 3/2016 |
| JP | 2002178359 A | 6/2002 |
| JP | 2003141908 A | 5/2003 |
| JP | 2007533485 A | 11/2007 |
| JP | 2008105207 A | 5/2008 |
| WO | 2014173445 A1 | 10/2014 |

OTHER PUBLICATIONS

First Office Action for Chinese Patent Application No. 201880032638.X dated Mar. 25, 2021.

* cited by examiner

PROCESS FOR MANUFACTURING A SHELL COMPRISING A DECORATIVE FILM

CROSS-REFERENCE TO RELATED APPLICATIONS

The present application is a National Stage of International Patent Application No. PCT/EP2018/062623, filed on May 15, 2018, which claims priority to and all the benefits of French Patent Application No. 1754265, filed on May 15, 2017, both of which are hereby expressly incorporated herein by reference in their entirety.

BACKGROUND OF THE INVENTION

1. Field of the Invention

The present invention relates to the technical field of part overmoulding, preferably by injection.

2. Description of the Related Art

Making plastic shells by implementing steps of moulding and overmoulding is known from the state of the art. More precisely, a first element of the shell is moulded by hot injection of plastic material into a dedicated mould. This first element then serves as a support for overmoulding one or several thicknesses of plastic, in order to form a high-thickness shell. Complex and robust plastic shells, comprising several indissociable elements, are hence formed.

According to another advantage, this method also makes it possible to manufacture plastic shells comprising materials of different natures to functionalize the shell. For example, a plastic shell may comprise a decorative film, that acts to modify its light transmission or reflection properties. Preferably, the decorative film is encapsulated between two layers of plastic in order to protect it from the outer environment.

Nevertheless, this manufacturing method has for drawback that the decorative film must be moulded, or overmouled, against another element. Now, the hot moulding or overmoulding method implements a step of injecting, in viscous or liquid form, the plastic material forming the decorative film. This injection step involves forming a decorative film whose optical properties are more or less homogeneous along the shell. According to another drawback, the overmoulding of the decorative film against an element of the shell, and conversely, also involves that the size of the decorative film is substantially equal to that of one or several elements adjacent to the decorative film. This manufacturing method hence does not allow a wide variety of possible patterns and shapes for the decorative film.

According to another drawback, during the overmoulding steps, the faces of the decorative film are exposed to high temperatures and pressures, liable to degrade and/or deform the decorative film, and hence the pattern thereof.

The need for a new method for manufacturing high-thickness plastic shells, comprising a decorative film with varied patterns and preserving at best the characteristics thereof during the manufacturing of the shell, hence appeared.

SUMMARY OF THE INVENTION

To achieve this objective, the invention proposes a method for manufacturing a shell, comprising a decorative film, implementing a first step of moulding a plastic material so as to form a first element.

The manufacturing method implements a second step consisting in applying a decorative film against a front face of the first element, then a third step of overmoulding a plastic material on at least one part of the decorative film and of the first element, so as to maintain the decorative film between the first element and a second element of the shell.

In other words, the decorative film and the first element of the shell are made independently from each other. So, contrary to the state-of-the-art method described hereinabove, during their union, the decorative film and the first element are not exposed to high temperatures and pressures liable to modify their characteristics. Indeed, this union step is performed at a temperature and a pressure lower than those necessary to inject a plastic material into a mould. That way, the properties of the interface between the decorative film and the first element are more accurately controlled.

It is to be noted that the third step implemented by the invention allows forming a second element of the shell, so that at least one part of the decorative film is protected from the outer environment by the first and the second element. Preferably, at least one part of the second element faces the first element to ensure a better holding of the decorative film between said elements.

According to another characteristic of the invention, the decorative film covers only a part of the front face of the first element of the shell. In other words, the surface area of the decorative film may be lower than the surface area of the front face of the first element. The invention hence proposes a manufacturing method allowing a wider variety of shapes for the decorative film.

According to another characteristic of the invention, the first element and/or the second element is transparent and/or translucent. One of the elements is transparent or translucent, to allow an observer to see the contours of the decorative film through said element. Preferably, the first and the second element are transparent to allow a light source to project the contours of the decorative film onto a plane of observation.

According to another characteristic of the invention, the decorative film is perforated. Hence, the properties of transmission of the light through the decorative film are heterogeneous along said film, to allow the making of more complex and varied patterns.

According to another advantage, the presence of one or several holes makes it possible to form passages, through the decorative film, in which the second element may enter during the third overmoulding step, so that the second element can adhere directly to the first element and hence ensure a better holding of the decorative film between the first and the second element.

According to another advantage, the passages may form at least one housing into which fits a protrusion of the first element, located at the front face thereof, so as to allow a better holding of the decorative film along said face during the third overmoulding step. This embodiment advantageously makes it possible to avoid a shifting of the decorative film with respect to the first element during the formation of the second element of the shell.

According to another embodiment of the invention, the first element and/or the second element comprise optical dioptres aligned with at least one hole perforating the decorative film. The optical dioptres allow modifying locally the intensity of a light beam passing through an element, to offer a wider variety of lighting of the shell.

According to another characteristic of the invention, the decorative film includes at least two areas transmitting differently the light. By way of example, the decorative film may comprise at least two areas of different colours. According to another example, the surface of the decorative film may be partially grained. According to another example, the decorative film may be composed of several distinct materials.

According to another characteristic of the invention, the decorative film is covered, at least partially, by a deposit of material. Preferably, the deposit of material covers the face of the decorative film applied against the first element. Hence, the decorative film forms a thermal shield, making it possible to significantly limit the elevation of temperature of the deposit of material during the third step of overmoulding the second element on the decorative film. The physical properties of the deposit of material are hence preserved, which makes it possible to avoid, during the third overmoulding step, a degradation of the pattern delimited by said deposit. The deposit of material is consisted of one or several layers. The transparency of the decorative film may then be modified as a function of the nature and the number of superimposed layers of material, from transparent to translucent, up to being fully opaque.

According to one embodiment, the deposit of material is formed from an ink, preferably comprising sliver, aluminium or chromium-based metallic elements. Hence, the deposit of material may be deposited on the decorative film by a screen-printing technique. To modify the aspect of the deposit of material, the surface thereof may be slightly abraded or brushed, before the third overmoulding step.

According to a variant embodiment, the manufacturing method implements an intermediate step of applying a bonding agent on the decorative film, in order to ensure a better holding of the decorative film against the first element during the overmoulding of the second element. This intermediate step is performed before the execution of the second step, consisting in applying the decorative film against a front face of the first element. Preferably, the bonding agent is applied at the periphery of the face of the decorative film applied against the first element. By way of example, the bonding agent may comprise a dedicated glue and/or adhesive of the double-sided type.

According to another characteristic of the invention, the front face of the first element has a complex shape and the decorative film has a shape complementary to that of the front face of the first element. By "complex shape", it is meant a relief surface. This embodiment advantageously makes it possible to ensure a better holding of the decorative film against the first element, by avoiding a sliding between these elements, in particular during the third overmoulding step.

According to a variant embodiment, the front face of the first element has a concave and/or convex shape. This characteristic takes advantage of the possibilities provided by the method according to the invention to make shells of complex shapes having no aspect or shape defect in so far as the method according to the invention makes it possible to efficiently control the shrinkage phenomena.

According to a preferred embodiment of the invention, the decorative film is a thermoformed plastic film. The thermoforming technique allows providing the decorative film with a certain rigidity and holding, facilitating the positioning and holding thereof against the first element of the shell so as to prevent the wrinkling thereof during the overmoulding with the second element of the shell.

According to another characteristic of the invention, the thickness of the decorative film is comprised between 0.4 mm and 0.6 mm, preferably of the order of 0.5 mm.

According to another characteristic of the invention, the local thickness of any part of a shell portion is lower than or equal to 6 mm, preferably lower than 4 mm. According to a characteristic of the invention, the local thickness of the shell is comprised between 1 mm and 5 mm, and preferably equal to or higher than 3 mm, so as to provide it with a certain mechanical strength, for it to be used as an outer shell. The local thickness is measured at a distance higher than 1 mm from the edges of the shell portion. By local thickness, it is to be understood the smallest of the distances between two opposite faces of the first and second element, of a part of a shell portion.

According to another characteristic of the invention, the manufacturing method may comprise other intermediate steps of overmoulding, in order to form one or several additional thicknesses between the first and the second element of the shell.

According to another characteristic of the invention, in the second element of the shell, the shell is fixed to a support. According to an embodiment, the shell may be fixed to the support by way of an appendage having a shape complementary to that of a housing present in the support.

According to a preferred embodiment of the invention, at least one element of the shell is formed from one of the following materials: poly(methyl methacrylate) (PMMA), polycarbonate (PC), acrylonitrile butadiene styrene (ABS) or mixtures of these latter. Of course, this list is neither limitative nor exhaustive.

The different characteristics, variants and embodiments mentioned hereinabove may be associated with each other according to various combinations insofar as they are not incompatible or exclusive relative to each other.

The invention also relates to a side light for an automotive vehicle comprising a shell obtained from one of the manufacturing methods described hereinabove.

BRIEF DESCRIPTION OF THE DRAWINGS

The invention will be better understood, thanks to the following description, which relates to preferred embodiments, given by way of non-limitative examples, and explained with reference to the appended schematic drawings, in which.

DETAILED DESCRIPTION OF THE INVENTION

As a reminder, the invention proposes a new method for manufacturing a high-thickness plastic shell, comprising a decorative film with varied patterns and preserving at best the characteristics thereof during the manufacture of the shell.

Within the meaning of the invention, a shell is a part whose thickness is small with respect to its developed length, or length measured along one of its large faces when the shell is not developable.

Figure 1:
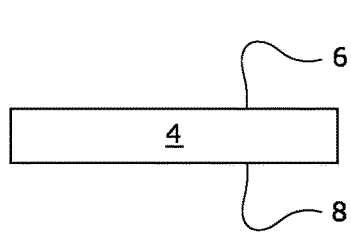
FIG. 1 is a side view of a first element of a shell according to the invention.
Figure 2:
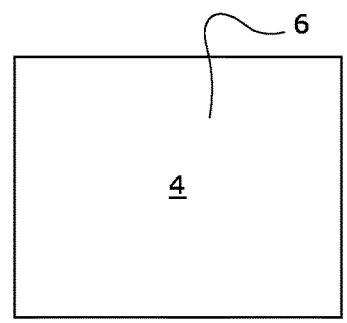
FIG. 2 is a top view of the first element illustrated in FIG. 1.

According to the invention, the manufacturing of the shell 2 is made as follows. During a first step, a first element 4 of the shell is moulded by a technique of hot injection of plastic material into a mould designed for that purpose. The plastic material used is, for example poly(methyl methacrylate) (PMMA). As illustrated in FIGS. 1 and 2, the first element 4 is delimited, at its larger faces, by a front face 6 opposed to a rear face 8. According to the present example, the surface delimited by the front face 6 is comprised between a few cm2 and a few m2. The thickness of the first element 4, defined as the distance separating the front face 6 from the rear face 8, is comprised between 1.5 mm and 3 mm, preferably comprised between 1.7 mm and 2 mm. According to the present example, the first element 4 is planar.

Figure 3:
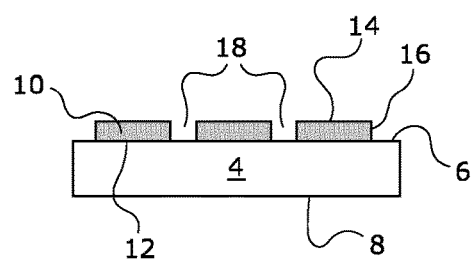
FIG. 3 is a side view of a decorative film positioned on a first element illustrated in FIG. 1.
Figure 4:
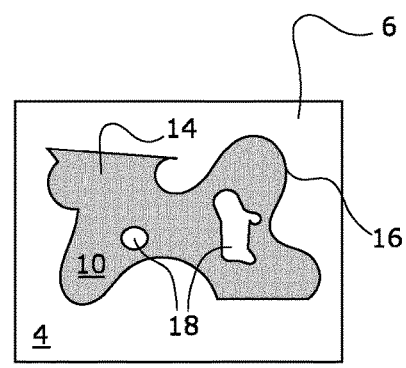
FIG. 4 is a top view of the unit illustrated in FIG. 3.

Then, during a second step illustrated in FIGS. 3 and 4, a decorative film 10 is applied against the front face 6 of the first element 4. This second step is performed after the first element 4 has been enough cooled down, so that the temperature of its front face 6 is lower than 80° C., preferably lower than 60° C. The risks of deformation or degradation of the rear face 12 of the decorative film, in contact with the front face 6 of the first element 4, are hence limited. The decorative film 10 may be of same or different nature that the first element 4. The decorative film is preferably thermoformed so as to provide it with a certain rigidity and to hence make the handling thereof easier. The thickness of the decorative film 10, separating its rear face 12 from an opposite front face 14, is comprised between 0.4 mm and 0.6 mm, preferably of the order of 0.5 mm. The contour 16 of the decorative film is adapted as a function of the pattern desired to be made in the shell 2. The invention hence allows a wider variety of pattern shapes by avoiding the necessity to overmould the decorative film 10 directly on the first element 4 or to have to overmould the first element 4 directly on the decorative film 10. According to the present example, the decorative film 10 is perforated at several places with holes 18, forming passages through said film. According to another characteristic, the size of the decorative film 10 is lower than that of the front face 6 of the first element 2. More precisely, the decorative film 10 is centred on the front face 6 of the first element 2. Of course, within the framework of the present invention, other sizes of the decorative film 10 and other arrangements on the first element 2 are conceivable.

Figure 5:
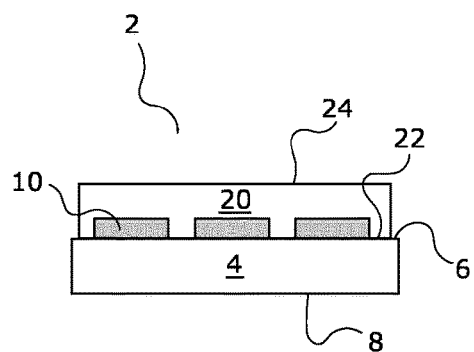
FIG. 5 is a side view of a shell according to the invention.
Figure 6:
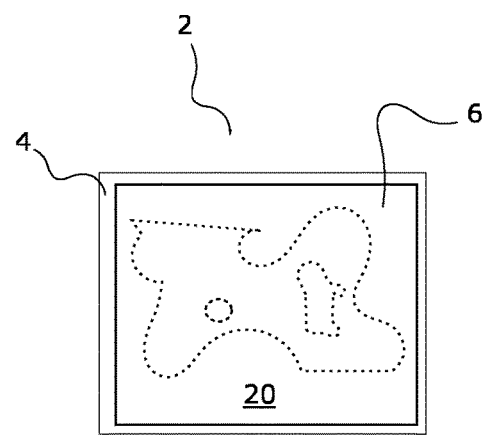
FIG. 6 is a top view of the shell illustrated in FIG. 5.

During a third and last step illustrated in FIGS. 5 and 6, the decorative film 10 is overmouled by injection of a plastic material, compatible with that used to form the first element 4, in order to form the shell 2 according to the invention. More precisely, the plastic material is spread against the front face 14 of the decorative film 10 and the front face 6 of the first element 4, so as to encapsulate the decorative film 10 between the first element 4 and a second element 20. The material used to form the second element 20 may be of same or different nature than that constituting the first element 4. The thickness of the second element 20, defined as being the distance separating a rear face 22 in contact with the decorative film 10 and the first element 4, and a front face 24 opposed to the rear face 22, is comprised between 1.5 mm and 3 mm, preferably comprised between 1.7 mm and 2 mm.

Several variant embodiments of the invention will now be described. The elements common to these different variants are indexed by the same digital references.

Figure 7:
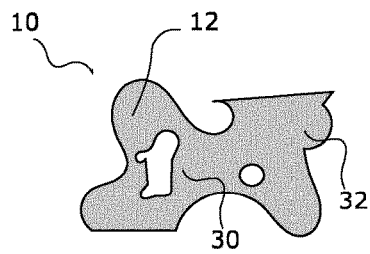
FIG. 7 is a bottom view of a screen-printing decorative film.

According to a first variant embodiment illustrated in FIG. 7, the decorative film 10 comprises, on its rear face 12, a pattern 30 delimited by a suitable ink 32. This embodiment is particularly advantageous when a decorative film with complex and accurate patterns is desired. By way of example, the pattern 30 may be a screen-printing made on the rear face 12 of the decorative film 10. According to another advantage, the decorative film 10 forms a heat protection shield making it possible to limit the elevation of temperature of the ink during the third step of overmoulding the second element 20, in order to preserve the contours and the colour of the ink 34. Of course, as a function of the temperature to which the decorative film 10 is exposed during this third step, the thickness and/or the nature of the decorative film may be adapted so that the temperature of the ink 32 does not exceed a critical temperature, beyond which the colour of ink and the shape of the pattern delimited by said ink may be degraded.

Figure 8:
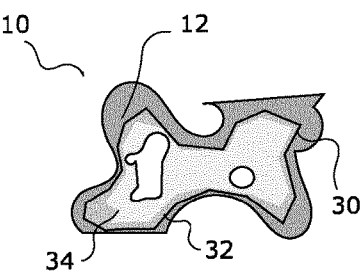
FIG. 8 is a bottom view of a decorative film according to FIG. 7, comprising a layer of glue.

According to another variant embodiment of the manufacturing method described hereinabove and not shown, previously to the second step, a glue 34 is applied at the periphery of the rear face 12 of the decorative film 10 during an intermediate step. The glue 30 allows for a better holding of the decorative film 10 against the first element 4, during the third step of overmoulding the second element 20. The glue that is used is preferably a glue that does not chemically attack the shell elements, nor the ink covering the decorative film. Preferably, the glue allows an operator to reposition at will the decorative film against the first element. According to an alternative, illustrated in FIG. 8, the glue is applied on the ink 32 so that the glue is not visible by an observer looking at the pattern 30 through the decorative film 10. This embodiment advantageously allows hiding the gluing marks behind the pattern 30.

Figure 9:
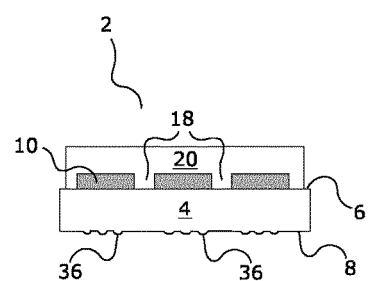
FIG. 9 is a view of an alternative embodiment of a shell illustrated in FIG. 5.

According to another variant illustrated in FIG. 9, the first element 4 may include optical dioptres 36 at the rear face 8 thereof, arranged so as to be aligned with the holes 18 perforating the decorative film 10. By "optical dioptres", it is meant elements modifying the trajectory of a light beam passing through the first element 4.

Figure 10:
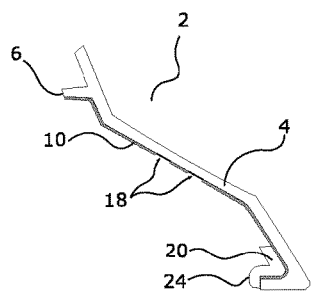
FIGS. 10 and 11 are schematic views of alternative embodiments of a shell illustrated in FIG. 5.

According to another variant illustrated in FIG. 10, the first element 4 has a complex shape. The decorative film 10 covers only a part of the front face 6 of the first element 4 and the second element 20 also covers a part of the front face 6 of the first element 4 and a part of the front face 14 of the decorative film 10.

Figure 11:
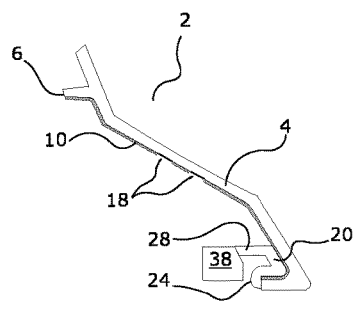

According to a variant illustrated in FIG. 11, the second element 4 includes at the front face 24 thereof a protrusion 28 that cooperates with a support 38, in order to maintain the shell 2 remote from the support.

Figure 12:
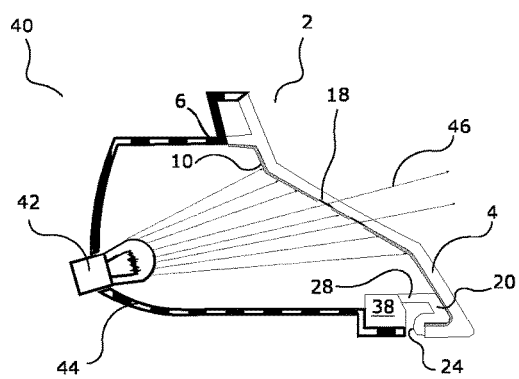
FIG. 12 is a schematic view of a longitudinal cross-section of a side light for an automotive vehicle, comprising a shell illustrated in FIG. 11.

As illustrated in FIG. 12, the invention also relates to a side light 40 for an automotive vehicle, comprising a light source 42 present in a casing 44 open at one of its sides. The opening of the casing is closed by a shell 2 as illustrated in FIG. 11, so as to form an outer wall of the side light. As mentioned hereinabove, the decorative film 10 is perforated in several places by holes 18, so as to let through the light rays 46 emitted by the light source 42. According to the present example, the other light rays are partially or totally absorbed by the decorative film 10 so that the contours of the holes 18 are more clearly marked out. According to an alternative not shown, the decorative film may be partially transparent and coloured so as to form a background of homogeneous colour on which the patterns formed by the holes 18 are marked out.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A method for manufacturing a shell, comprising a decorative film and a first and second element, the method comprising the steps of:
   moulding a plastic material so as to form the first element;
   applying the decorative film against a front face of the first element;
   overmoulding a plastic material on at least one part of the decorative film and of the first element so as to maintain the decorative film between the first element and the second element of the shell;
   perforating the decorative shell; and
   wherein the first element and/or the second element include optical dioptres aligned with at least one hole perforating the decorative film.

2. The method for manufacturing a shell as set forth in claim 1, wherein the decorative film covers only a part of the front face of the first element of the shell.

3. The method for manufacturing a shell as set forth in claim 1, wherein the first element and/or the second element is transparent and/or translucent.

4. The method for manufacturing a shell as set forth in claim 1, wherein the decorative film includes at least two areas transmitting differently a light.

5. The method for manufacturing a shell as set forth in claim 4, wherein the deposit of material is formed from an ink.

6. The method for manufacturing a shell as set forth in claim 1, wherein the decorative film is covered, at least partially, by a deposit of material.

7. The method for manufacturing a shell as set forth in claim 6, wherein the deposit of material covers the face of the decorative film applied against the first element.

8. The method for manufacturing a shell as set forth in claim 1, wherein the method implements an intermediate step of applying bond mean on the decorative film, in order to ensure a better holding of the decorative film against the first element during the overmoulding of the second element.

9. The method for manufacturing a shell as set forth in claim 1, wherein the front face of the first element has a complex shape and in that the decorative film has a shape complementary to that of the front face of the first element.

10. The method for manufacturing a shell as set forth in claim 1, wherein the decorative film is a thermoformed plastic film.

11. The method for manufacturing a shell as set forth in claim 1, wherein the second element of the shell is provided with a support and the shell is fixed to the support.

* * * * *